United States Patent
Okubo

(10) Patent No.: US 10,452,324 B2
(45) Date of Patent: Oct. 22, 2019

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yuzuru Okubo, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 161 days.

(21) Appl. No.: 14/953,660

(22) Filed: Nov. 30, 2015

(65) Prior Publication Data

US 2016/0154613 A1   Jun. 2, 2016

(30) Foreign Application Priority Data

Dec. 2, 2014   (JP) .................. 2014-244099

(51) Int. Cl.
*G06F 3/12* (2006.01)
*H04L 29/06* (2006.01)
*H04L 29/08* (2006.01)
*H04L 29/14* (2006.01)

(52) U.S. Cl.
CPC ............ *G06F 3/1207* (2013.01); *G06F 3/121* (2013.01); *G06F 3/122* (2013.01); *G06F 3/1204* (2013.01); *G06F 3/1247* (2013.01); *G06F 3/1259* (2013.01); *G06F 3/1292* (2013.01); *H04L 67/2823* (2013.01); *H04L 67/42* (2013.01); *H04L 69/40* (2013.01)

(58) Field of Classification Search
CPC ...... G06F 3/1207; G06F 3/122; G06F 3/1204; G06F 3/1247; G06F 3/1259; G06F 3/1292; G06F 3/121; G06F 3/1214; G06F 3/1276; G06F 3/1244; H04L 69/40; H04L 67/2823; H04L 67/42; G06K 15/4005; G06K 15/1859
USPC ...................................... 358/1.15
See application file for complete search history.

(56) References Cited

U.S. PATENT DOCUMENTS

| | | | | |
|---|---|---|---|---|
| 6,657,740 | B1 * | 12/2003 | Emminizer | G06F 3/1203 358/1.14 |
| 2007/0058196 | A1 * | 3/2007 | Nagahara | G06F 3/1211 358/1.15 |
| 2011/0154146 | A1 * | 6/2011 | Shin | H04L 1/1832 714/749 |
| 2013/0107315 | A1 * | 5/2013 | Ozawa | G06F 3/1222 358/1.15 |

FOREIGN PATENT DOCUMENTS

| | | | |
|---|---|---|---|
| JP | 11316721 A | * | 11/1999 |
| JP | H11316721 A | | 11/1999 |

* cited by examiner

*Primary Examiner* — Kent Yip
(74) *Attorney, Agent, or Firm* — Carter, DeLuca & Farrell LLP

(57) ABSTRACT

A printing system of one embodiment according to the present invention queries a storage server to acquire a URL list of a created file of a conversion server 101 by which a client computer performs data processing. The client computer determines whether or not the data processing is proceeding based on the acquired URL list. If a number of times that the client computer has determined that the data processing is not proceeding exceeds a predetermined threshold, the client computer determines that the server is not operating normally.

13 Claims, 12 Drawing Sheets

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

In recent years, many information apparatuses have become connected to the internet and various coordination has been considered. For example, there is a printing solution on the internet. When a user wants to print by a printer from the mobile terminal, the mobile terminal often cannot directly convert a document to a printable document format. In this case, by the mobile terminal requesting a service on the internet to convert a document to a printable document format, printing from the mobile terminal can be available.

When creating such a solution using the internet, a cloud base of the third party is often used. The cloud base is a service on the internet providing a virtualized platform. By using the cloud base of a third party, a solution provider does not have to hold and maintain hardware, and therefore there is a merit that a small initial investment is required. Thus, the use of the cloud base is increasing.

The cloud base provides various services. Among those services, a service having a simple function is more inexpensive. For example, comparing a computer service lending a virtual PC and a storage service that is only available for storing and reading out files, the storage service that cannot perform original processing is more inexpensive. The solution provider often incorporates the inexpensive storage server into the solution in order to suppress the cost of the solution.

As described above, the storage service provided by the cloud base of a third party is often a service for only uploading and downloading files, and functions are restricted. Thus, when incorporating the storage server into a printing solution on the internet, for example, a server that converts data to a printable document format cannot provide notification to a client about the completion in converting the printing source document. The client needs to confirm the completion of the processing by polling.

Japanese Patent Laid-Open No. H11-316721 discloses a file transmission method in which a list of download files, which are information for downloading files to a terminal, is stored at a server side in advance, and is transmitted to the terminal. Furthermore, the terminal compares the content of the acquired download list and the download list previously acquired, and if the content has been updated, the terminal requests the file from the server.

In the printing solution system, it is contemplated that the client acquires a file converted in a printable document format from the storage service as a URL list (a download list) by polling. At this time, the client can confirm the completion of the processing by performing a reacquisition of the URL list until the total number of files (total number of pages) of printing data and the number of converted files (the number of pages) match. However, since the URL list is continuously acquired until the total number of pages and the number of converted pages match, a load of the server and the communication cost increase. Setting an upper limit for the number of acquisitions of the URL list may be considered, but even if the URL list is updated during a process (a normal case), the acquisition may stop because of the number of acquisitions of the URL list reaching the upper limit.

SUMMARY OF THE INVENTION

The present invention provides an information processing system by which the client can approximately determine whether or not a server, which performs data processing, is normally operating while not increasing a load of the server and the communication cost.

According to an aspect of the present invention, an information processing apparatus includes: an acquisition unit configured to acquire a list of a file created by a server; a count unit configured to count a number of acquisitions if a number of files in a list of a file presently acquired by the acquisition unit does not exceed a number of files in a list of a file previously acquired by the acquisition unit; and a notification unit configured to report an error, if the number of acquisitions exceeds a predetermined number of times.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

Firstly, a definition of terms used in the description of the present embodiment is given.

TCP (Transmission Control Protocol) is a protocol generally used in communication for which reliability is required, such as file transmitting and receiving. HTTP (Hypertext Transfer Protocol) is a protocol (RFC1945, RFC2068, and RFC2616) used in transmitting and receiving variable contents between a Web client and a Web server. Web service usually uses this HTTP for performing communication.

Figure 1:
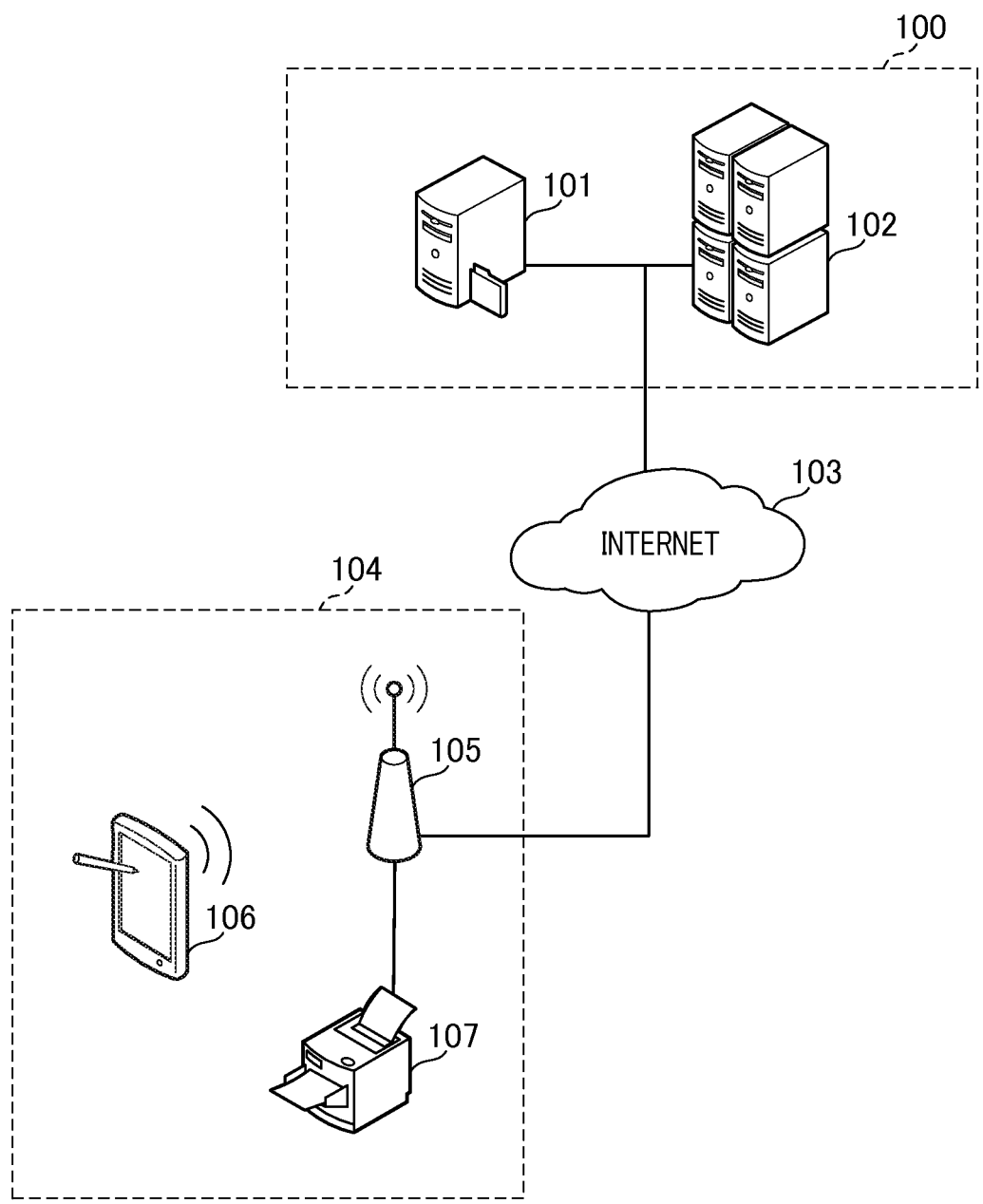
FIG. 1 illustrates an example of an overall configuration of an information processing system according to one embodiment of the present invention.

FIG. 1 illustrates an example of an overall configuration of a printing solution system (printing system) as an example of an information processing system according to the present embodiment.

A network 100 of a server side and a network 104 of a client side are respectively connected to an internet 103. The internet 103 is a communication line network based on an international standard such as the TCP/IP protocol for exchanging information between each of the network. A conversion server 101 has a document conversion function. A storage server 102 provides a storage function. A wireless router 105 is connected to the internet 103. The wireless router 105 is capable of wireless communication with a client computer 106. Also, the client computer 106 and a printing processing apparatus (image processing apparatus) 107 can communicate with each other through the wireless router 105. Here, the printing apparatus 107 may include a copy function, a scanner function, a facsimile transmission function, or the like in addition to the printing function. The printing processing apparatus 107 and the wireless router 105 can communicate with each other, and the connection form may be wireless. Furthermore, the conversion server 101 is capable of converting data into a document format (data format) that the printing processing apparatus 107 can print or the client computer 106 can process. The conversion server 101 and the storage server 102 may be configured by a plurality of computers. Also, the conversion server 101 and the storage server 102 may be configured as a virtual PC.

Figure 2:
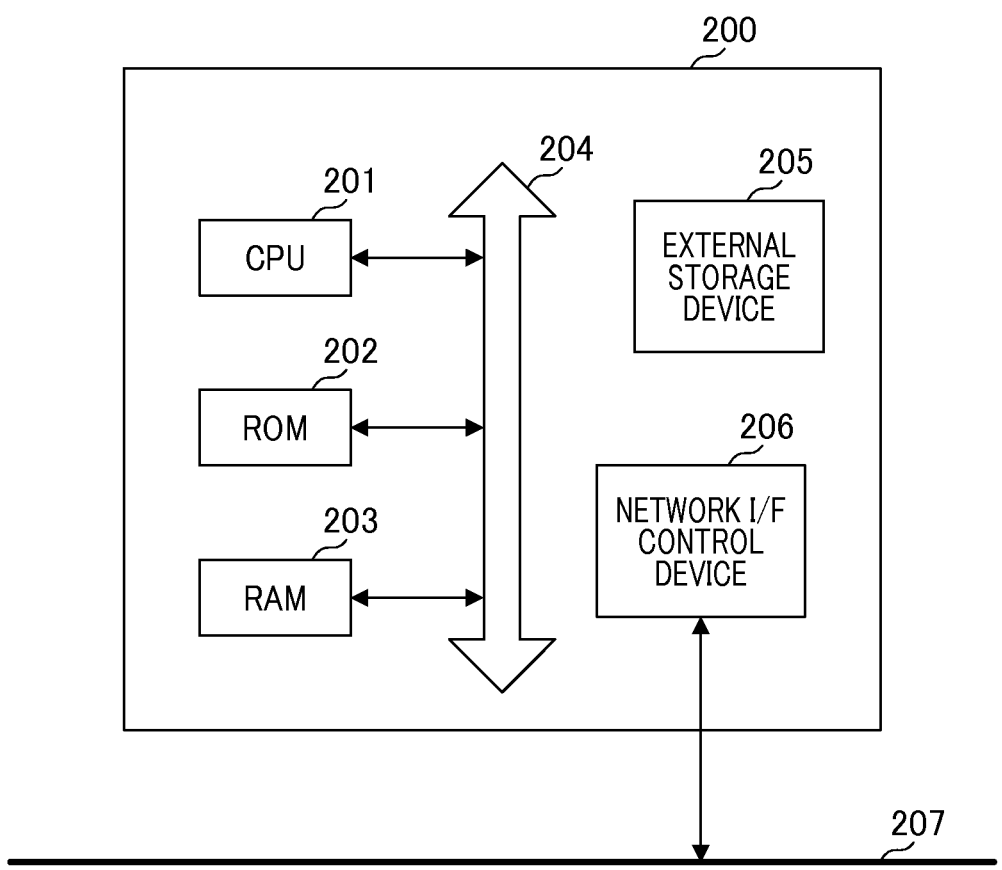
FIG. 2 illustrates an exemplary hardware configuration of an information processing apparatus.

FIG. 2 illustrates an exemplary hardware configuration of an information processing apparatus such as the client computer and each of the servers according to the present embodiment.

An information processing apparatus 200 includes a CPU 201. The CPU 201 performs processing in which figures, images, characters, and tables (including spreadsheets and the like) coexist based on the document processing program and the like stored in a ROM 202, a RAM 203, or an external storage device 205. Furthermore, the CPU 201 integrally controls each of the devices connected to a system bus 204. The client computer 106 may include an input output device.

The ROM 202 or the external storage device 205 stores an operating system, which is a control program for the CPU 201, or the like. Furthermore, the ROM 202 or the external storage device 205 stores various data. The RAM 203 functions as a main memory, work area, and the like for the CPU 201, and a network I/F control device 206 controls transmission and reception of data between a LAN 207. Note that the network I/F control device 206 may be a wireless communication device. In other words, the network I/F control device may include a wireless antenna or a device for controlling them.

Figure 3:
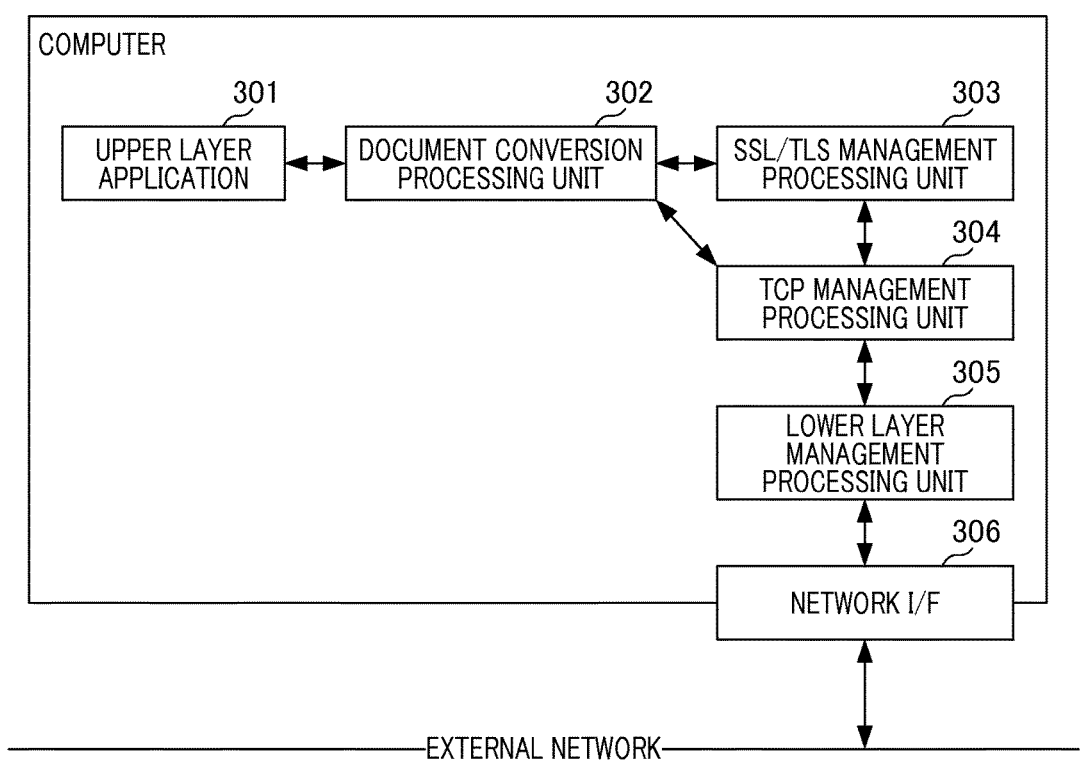
FIG. 3 illustrates an exemplary software configuration of a client computer.

FIG. 3 illustrates an exemplary software configuration of the client computer according to the present embodiment.

A document conversion processing unit 302 manages the transmission and reception processing using HTTP communication, and provides interface for an upper layer application 302. Also the document conversion processing unit 302 manages data transmission and reception with the lower layers. In the present embodiment, the document conversion processing unit 302 is described in the form of a software library. However, the function may be implemented in the operating system itself, or in the hardware of the network I/F 306. In other words, if the equivalent function and the interface can be provided to the upper layer application 301, the place where they are implemented does not matter.

A TCP management processing unit 304 manages the TCP connection. More specifically, the TCP management processing unit 304 manages connections, reception, transmitting and receiving, and the like of the TCP connection, and provides notification about the result of the upper layer application 301 or the like. Furthermore, the TCP management processing unit 304 not only directly notifies the upper layer application 301 about the result, but also may use a middle layer such as a SSL/TLS management processing unit 303. Note that SSL/TLS is a WEB service for performing authentication, encryption, and manipulation detection, and is a typical technique to be used.

The processing up to the TCP management processing unit 304 satisfies the regulations of RFC 793 (TRANSMISSION CONTROL PROTOCOL) and if an available API is provided, the implementation method does not matter. In other words, if the TCP management processing unit 304 and the lower layer management processing unit 305 provide a suitable API, the implementation does not matter. The TCP management processing unit 304 and the lower layer management processing unit 305 is often provided by the operating system, but they may be implemented directly. The implementation method is generally widely known, and thus, the description thereof will be omitted.

In this context, when the client computer 106 performs printing by the printing processing apparatus 107, considered a service, in the conversion server 101, of converting data received from the client computer 106 to data processable by the printing processing apparatus 107. Note that, in the present embodiment, the HTTP protocol is used for the communication protocol, but the protocol is not limited thereto. Other protocols or originals having an equivalent function may be used.

Figure 4:
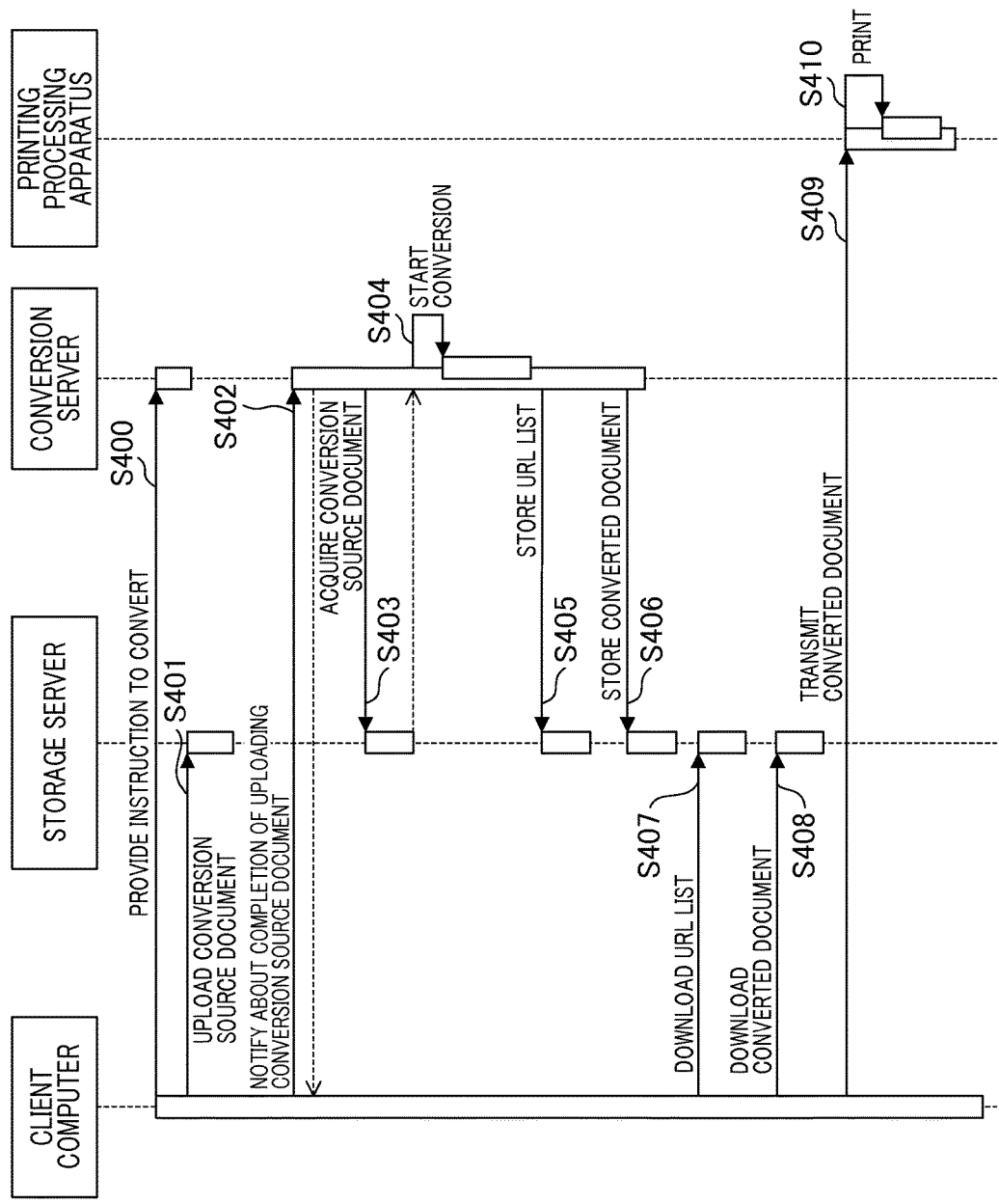
FIG. 4 is a sequence diagram illustrating a document conversion solution.

FIG. 4 is a sequence diagram illustrating a document conversion solution using the internet according to the present embodiment.

Firstly, in step S400, the client computer 106 provides an instruction to convert to the conversion server 101. In response to the instruction, the conversion server 101 returns an upload destination URL of conversion source document to the client computer 106. In step S401, the client computer 106 uploads the conversion source document to the upload destination URL acquired in step S400. The upload destination URL indicates the storage server 102. In step S401, only the conversion source document is uploaded but other supplementary information may be uploaded. For example, the supplementary information may include the specification of format type after the conversion, the resolution, the file name, the page range, or the like.

In step S403, the conversion server 101 acquires the conversion source document form the storage server 102. Then, in step S404, the conversion server 101 starts converting the document. In step S405, the conversion server 101 stores a URL list 501 in the storage server 102. The URL list 501 is a list of storage destination URLs (list of a file) at which data for one page of a converted document already created by the conversion server 101 is stored. In step S406, the conversion server 101 stores the converted document in the storage server 102. In step S407, the client computer 106 queries the storage server 102 about the URL list 501 and downloads the URL list 501. In step S408, the client computer 106 downloads the converted document from the storage server 102. Note that the processing shown sequentially in step S404 to S406 of FIG. 4 is actually performed asynchronously and the order of the processing does not matter. In other words, there are cases in which the processing of step S405 and step S406 may be performed before the conversion of all of the pages has completed. Thus, in the URL list 501, only the URL of which the conversion has completed is described, and the client computer 106 repeats step S407 until the URL list 501 for total number of pages has been acquired. The processing of step S408 does not necessary have to wait until the URL list 501 for total number of pages has been acquired, and therefore, the client computer 106 may start downloading when the converted document becomes downloadable.

In step S409, the client computer 106 transmits the converted document to the printing processing apparatus 107. In step S410, the printing processing apparatus 107 prints the received converted document. For shortening the overall processing time, the processing shown in step S408 to step S410 may be performed asynchronously. In other words, without waiting the completion of downloading all of the pages of the converted document, the page that the download has completed may be immediately used for the printing processing of step S409 and step S410. In the present embodiment, the client computer 106 downloads the converted document in step S408 to S409 and transmits to the printing processing apparatus 107, but it is not limited thereto. For example, the printing processing apparatus 107 may acquire the converted document from the storage server 102 directly without the client computer 106.

Figure 5:
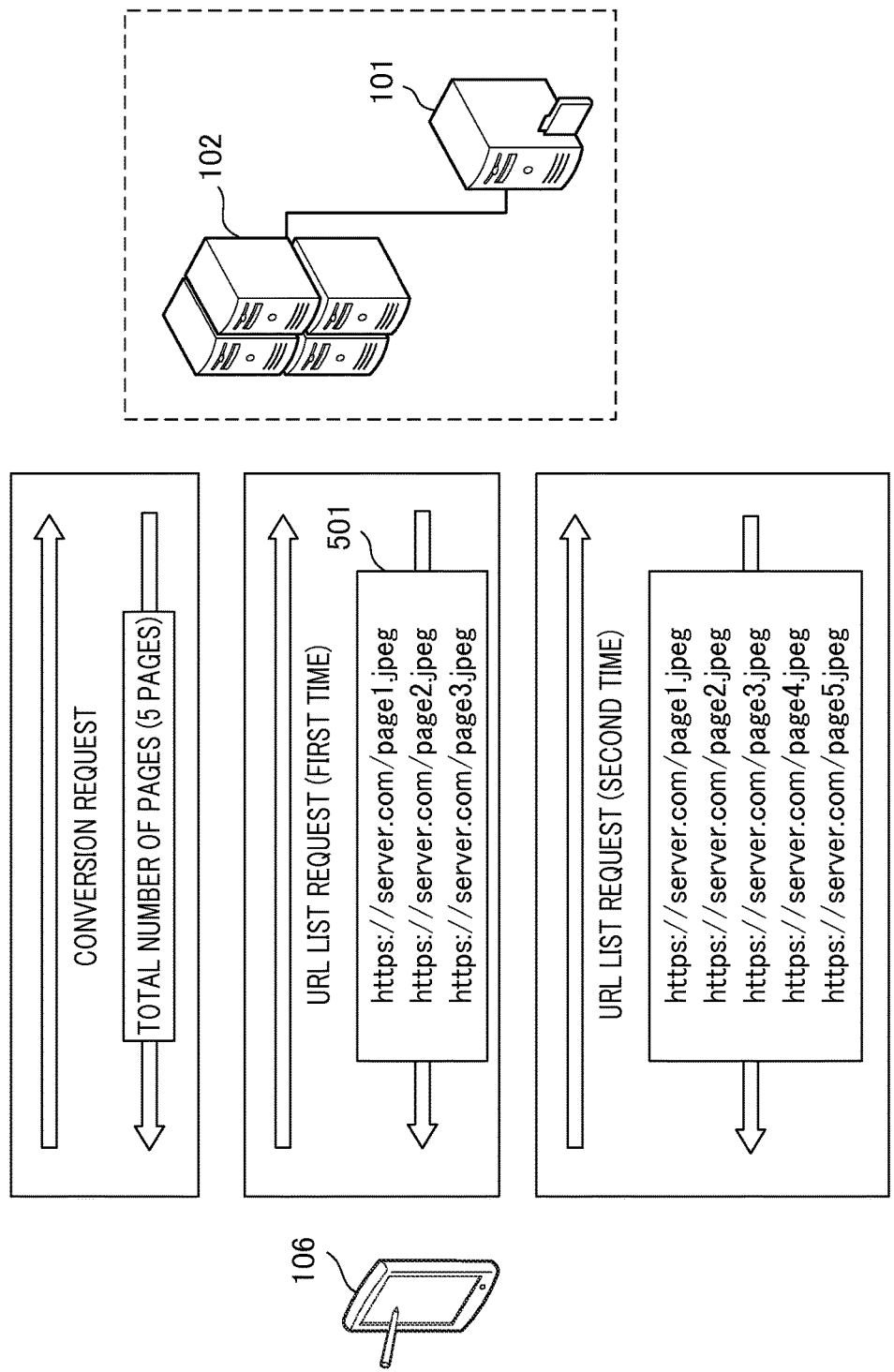
FIG. 5 is a diagram illustrating an exchange of a URL list.

FIG. 5 is a diagram illustrating an exchange of the URL list between the client computer and the storage server.

The URL list 501 is a list of storage destination URLs at which data at which one page of the converted document is stored. In FIG. 5, the case in which the client computer 106, the conversion server 101, and the storage server 102 have normally finished the exchange is shown.

Firstly, in response to a conversion request from the client computer 106, the conversion server 101 returns the information that the conversion can be carried out and the total number of pages of the document after the conversion. In the example shown in FIG. 5, "5 pages" is returned as the total number of pages after the conversion. There are cases in which the total number of pages of the conversion source document and the total number of pages of the converted document do not match, and thereby, the total number of pages of the converted document is necessary. In FIG. 5, uploading the conversion source document or the settings for printing is not shown, but they may be performed at the same time as the conversion request.

Next, the client computer 106 transmits the first request of the URL list to the storage server 102. The storage server 102 returns the URL list 501 received from the conversion server 101 to the client computer 106. In the example shown in FIG. 5, the URL list 501 including data for 3 pages is returned.

Then, the client computer 106 transmits the second request of the URL list to the storage server 102. The storage server 102 returns the URL list 501 received from the conversion server 101 to the client computer 106 the same as the first time. In the example shown in FIG. 5, the URL list 501 including data for 5 pages is returned. As the total number of pages and the number of pages in the received URL list 501 matched, the client computer 106 determines that the conversion server has finished the conversion processing.

Figure 6:
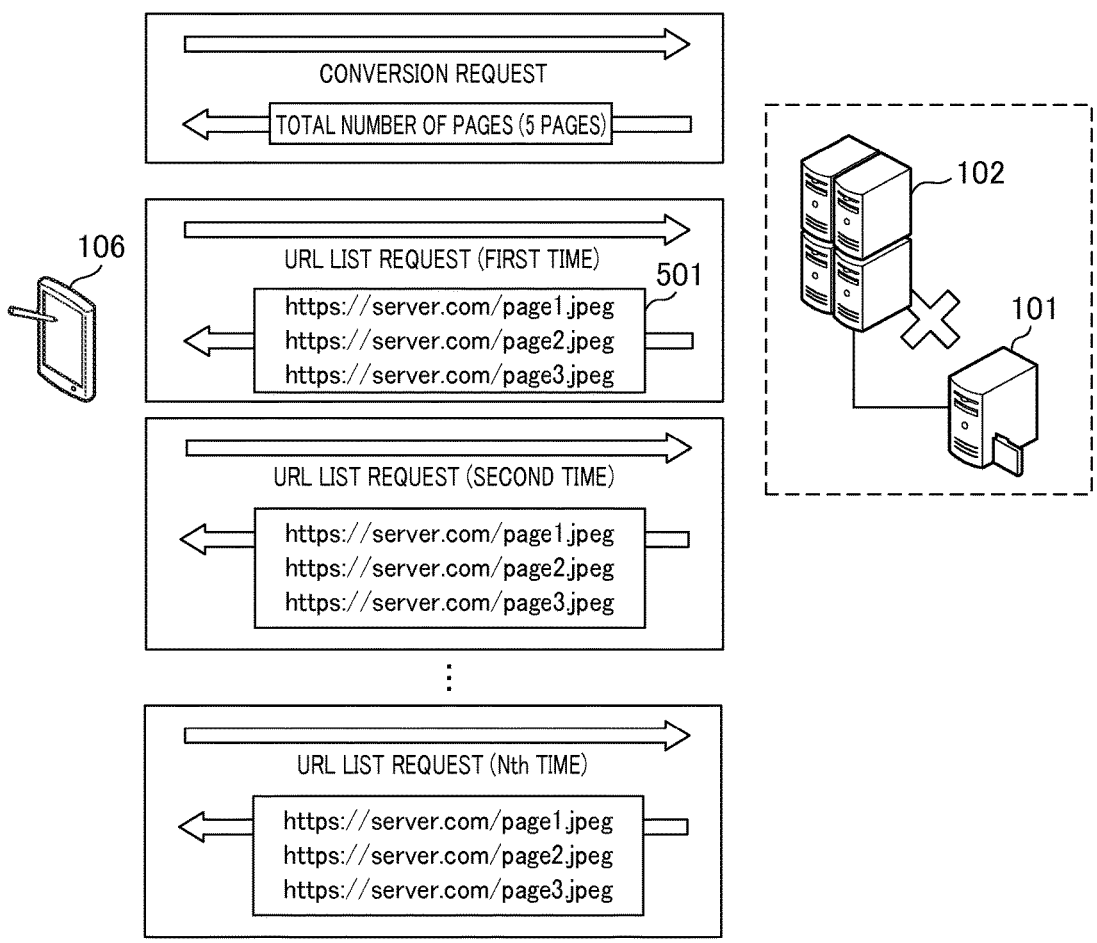
FIG. 6 is a diagram illustrating an exchange of the URL list.

FIG. 6 is a diagram illustrating an exchange of the URL list between the client computer and the storage server in a case where some problem has occurred between the conversion server and the storage server or inside the conversion server.

The URL list is same as that shown in FIG. 5 up to the first request. When the client computer 106 transmits the second request of the URL list, the URL list 501 only includes URLs for which the data for 3 pages is the same as the first. After that, assume that in responses to several requests, only the URL list 501, which includes data for 3 pages, is acquired from the storage server 102. In this case, it is considered that there are some problems at the server side. However, by simply limiting the number of acquisitions of the URL list, when processing that requires time such as converting large pages of document or the like, an erroneous determination that there is a problem even if the conversion is normally performed may occur. Accordingly, in the present embodiment, a server state is determined based on the updated content of the URL list.

Figure 7:
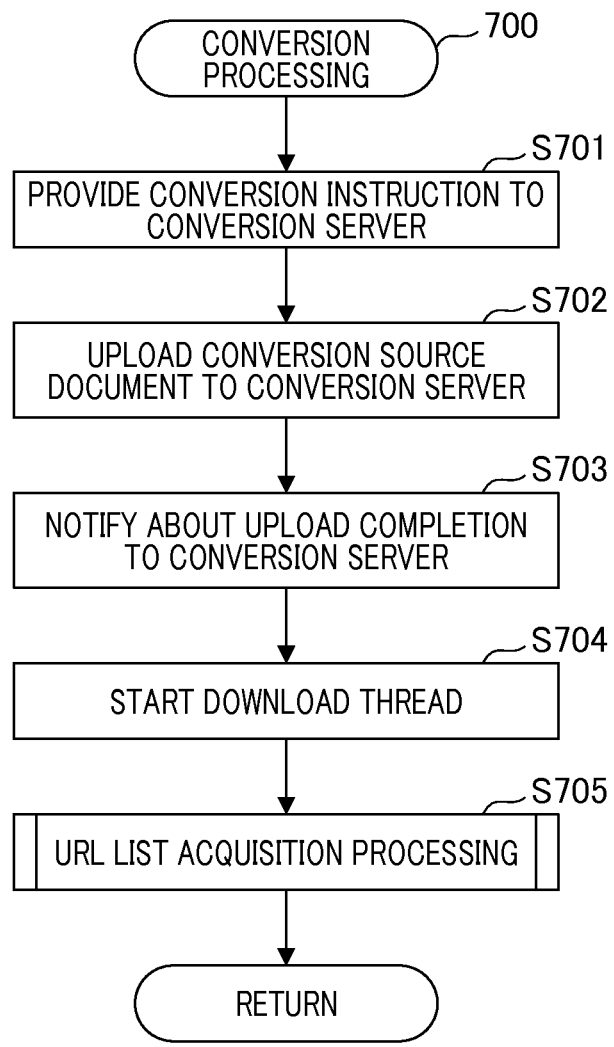
FIG. 7 is a flowchart illustrating conversion processing.

FIG. 7 is a flowchart illustrating a conversion processing that the client computer performs.

The conversion server 101 and the storage server 102 satisfy the functions of a typical HTTP server and GET method, HEAD method, the PUT method, and the like are available. The processing between a typical server and a client according to HTTP is widely known and the description thereof will be omitted.

Firstly, the upper layer application 301 of the client computer 106 receives a printing instruction from an end user and provides a conversion instruction to the document conversion processing unit 302. The document conversion processing unit 302 that has received the conversion instruction starts conversion processing 700. In step S701, the document conversion processing unit 302 provides the conversion instruction to the conversion server 101. The processing in step S701 is as same as the processing in step S400 shown in FIG. 4. The document conversion processing unit 302 acquires the upload destination URL of the conversion source document as a result of step S701. In step S702, the document conversion processing unit 302 uploads the conversion source document to the acquired upload destination URL. As a method for uploading, there are the POST method and PUT method in HTTP, but it is not limited thereto. The method may be another method provided that uploading is possible by using HTTP. The processing in step S702 is as same as the processing in step S401 shown in FIG. 4.

In step S703, the document conversion processing unit 302 notifies the conversion server 101 that the upload is completed As a method for notification, there are the GET method, POST method, and the like for HTTP, but the method is not limited thereto. The method may be another method provided that notification is possible by using HTTP. The processing in step S703 is the same as the processing in step S402 shown in FIG. 4. In step S704, the document conversion processing unit 302 starts a download thread. The download thread is a thread for asynchronously downloading the document converted by the conversion server 101 and notifying the upper layer application 301 about the result. For speeding up the download, a plurality of download threads may be used. In step S705, the document conversion processing unit 302 acquires the URL list 501.

Figure 8:
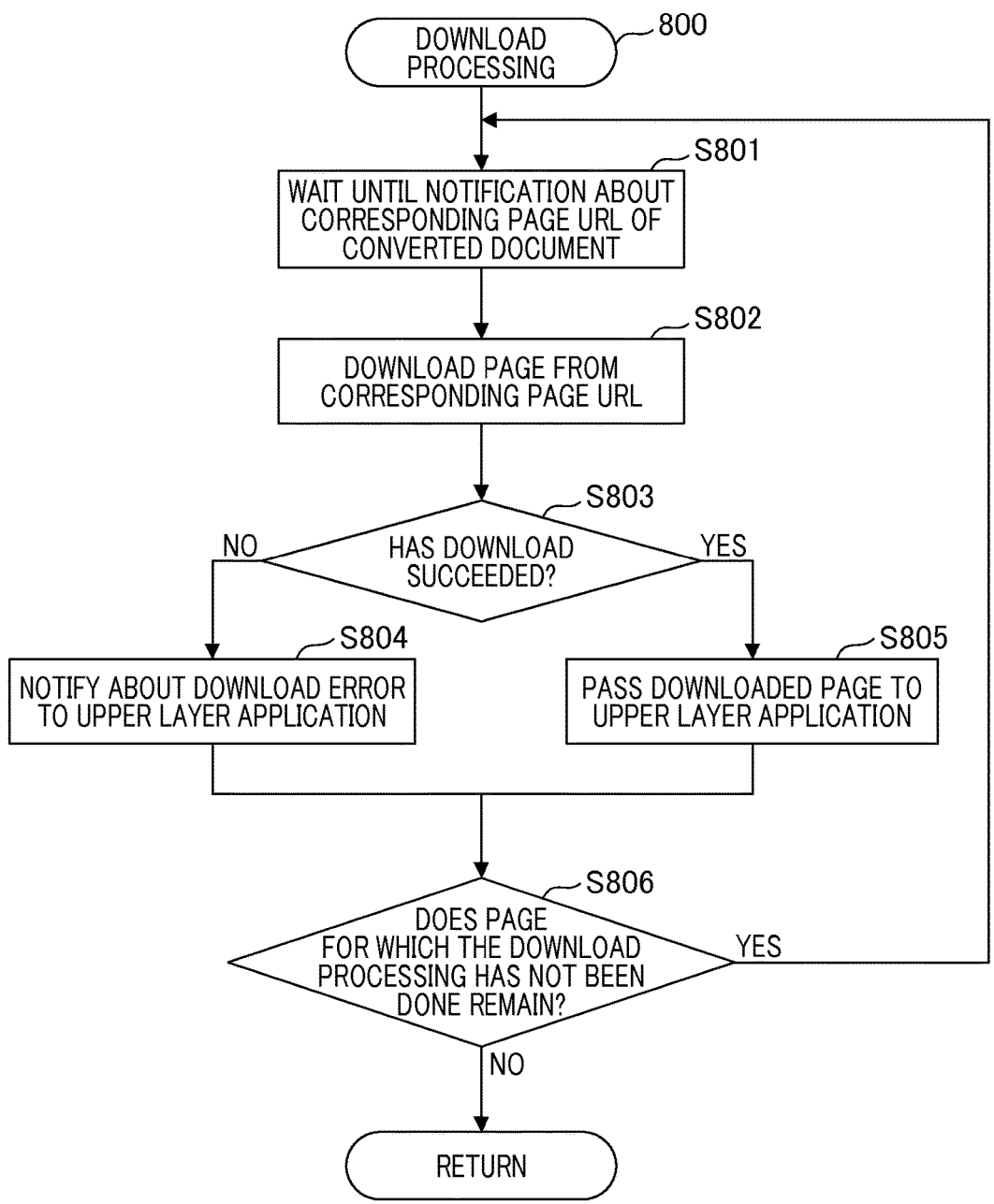
FIG. 8 is a flowchart illustrating download processing.

FIG. 8 is a flowchart illustrating processing for starting the download thread in step S704 shown in FIG. 7.

The document conversion processing unit 302 starts, in step S704, the thread of which download processing 800 is the starting point. In step S801, the document conversion processing unit 302 makes the thread to wait until notification has been provided about the URL of the corresponding page of the converted document. After notification has been provided about the URL of the corresponding page, in step S802, the document conversion processing unit 302 downloads the converted page from the URL of the corresponding page. In step S803, if the download has succeeded, the processing proceeds to step S805, and if not, the processing proceeds to step S804. In step S804, the document conversion processing unit 302 notifies the upper layer application 301 that the download of the corresponding page has failed. In step S805, the document conversion processing unit 302 passes the downloaded page to the upper layer application 301. Note that, in FIG. 8, downloading the page is only performed once, but considering the congestion of the wireless line or the like, processing for retrying may be performed. In step S806, the document conversion processing unit 302 confirms whether or not a page for which the download processing is not done exists. If there is a page that the download processing is not done, the processing returns to step S801 and the document conversion processing unit 302 subsequently tries to download the corresponding page. If all of the pages have been downloaded, the processing ends and returns to the calling process.

Figure 9:
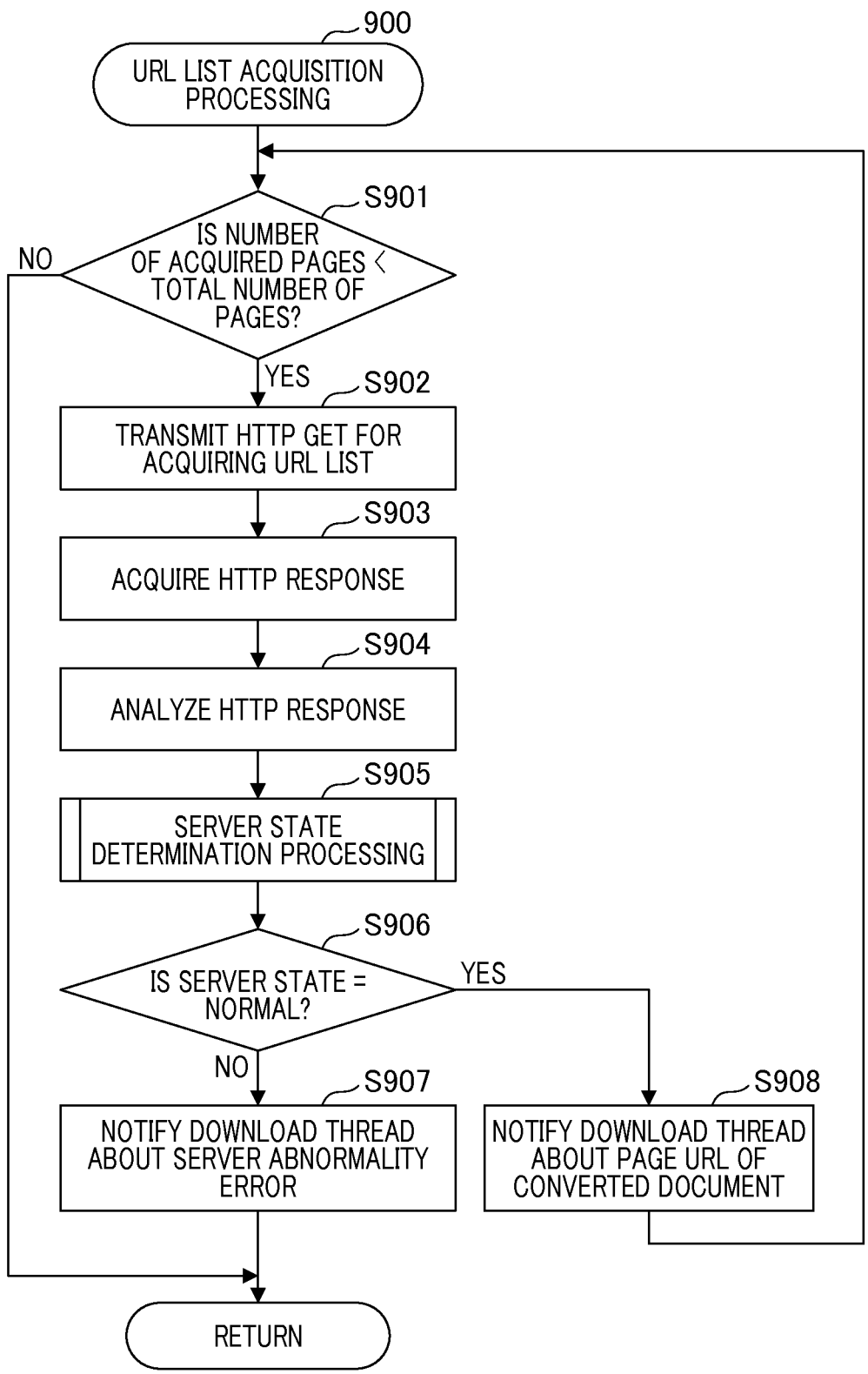
FIG. 9 is a flowchart illustrating URL list acquisition processing.

FIG. 9 is a flowchart illustrating a URL list acquisition processing of step S705 shown in FIG. 7.

The URL list acquisition processing 900 is performed by the document conversion processing unit 302. Firstly, in step S901, the document conversion processing unit 302 compares the number of pages of the URL list 501 that have been acquired (a number of files already created) and the total number of pages. If the URLs for total number of pages have not all been acquired, the processing proceeds to step S902. If the URLs for total number of pages have all been acquired, the processing ends and returns to the calling process. In step S902, the document conversion processing unit 302 transmits a request of an HTTP GET method to the storage server 102 for acquiring the URL list 501. Note that it is not limited to the GET method, but also other methods can be used if HTTP is used. In step S903, the document conversion processing unit 302 acquires a response and, in step S904, the document conversion processing unit 302 analyzes the response. In step S905, the document conversion processing unit 302 determines whether or not the conversion server 101 is normally operating. If the document conversion processing unit 302 determines that the state of the conversion server 101 is abnormal, the processing proceeds to step S907. In step S907, the document conversion processing unit 302 notifies the download thread about the server abnormality error. In contrast, if the document conversion processing unit 302 determines that the state of the conversion server 101 is normal, the processing proceeds to step S908. In step S908, the document conversion processing unit 302 notifies the download thread about the acquired page URL of the converted document.

Figure 10:
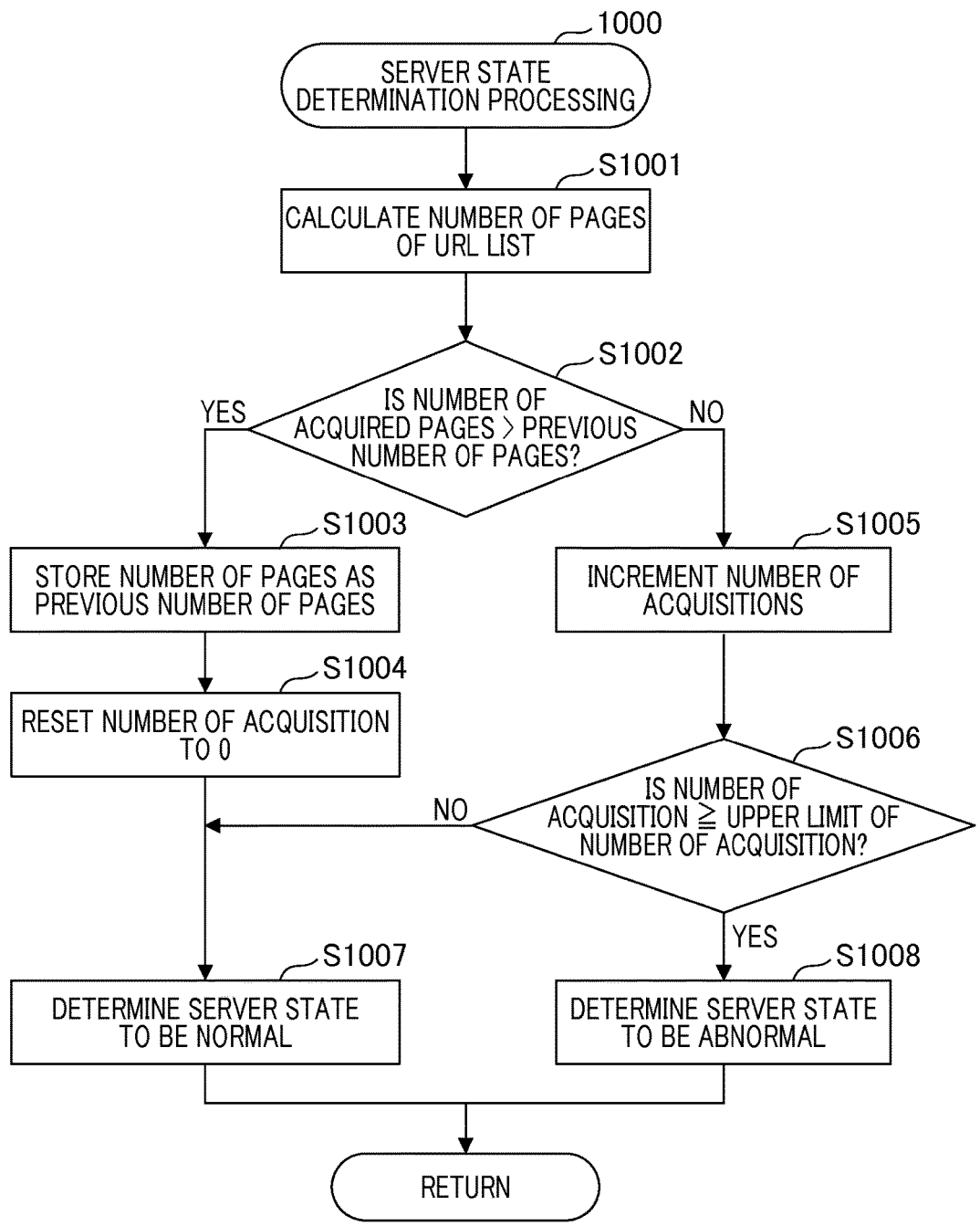
FIG. 10 is a flowchart illustrating server state determination processing.

FIG. 10 is a flowchart illustrating a server state determination processing of step S905 shown in FIG. 9.

The server state determination processing 1000 is performed by the document conversion processing unit 302. Firstly, in step S1001, the document conversion processing unit 302 calculates the number of pages of the acquired URL list 501. In step S1002, the document conversion processing unit 302 compares whether the number of pages of the URL list 501 that have already been acquired is larger than the number of pages previously acquired. If it is larger, the processing proceeds to step S1003, and if not larger, the processing proceeds to step S1005. In step S1003, the document conversion processing unit 302 stores the number of pages presently acquired as the number of pages previously acquired. In step S1004, the document conversion processing unit 302 resets the number of acquisition of the URL list 501 to 0. By resetting the number of acquisitions, the erroneous detection, in which the conversion processing requiring long time for the large pages of document of the conversion server 101 is determined to be an abnormal state, is suppressed and the acquisition of the converted document can be performed.

If, in step S1002, it is determined that the number of pages of the URL list 501 that have already been acquired is not larger than the number of pages acquired last time, in other words, the URL list 501 is not updated (the processing is not proceeding), and the processing proceeds to step S1005. In step S1005, the document conversion processing unit 302 increments the number of acquisitions (count value). In step S1006, the document conversion processing unit 302 compares whether or not the number of acquisitions exceeds an upper limit of the number of acquisition. If the number of acquisitions exceeds the upper limit, the processing proceeds to step S1008, and if not, the number of acquisition exceeds the upper limit, and the processing proceeds to step S1007. In step S1007, the document conversion processing unit 302 determines that the state of the server is normal, ends the processing, and returns to the calling process. In contrast, in step S1008, the document conversion processing unit 302 determines that the state of the server is abnormal, ends the processing, and returns to the calling process. In this way, in the state that the total number of pages of the converted document and the number of pages of the URL list 501 that have already been acquired do not match, and the abnormal state can be appropriately inferred while not increasing the load of the server and the communication cost. Also, the user can be notified about the abnormality more quickly.

As described above, according to the present embodiment, an information processing system by which the user can appropriately determine whether or not the server performing the data processing is normally operating while not increasing the load of the server and the communication cost can be provided.

Second Embodiment

Next, a description will be given of an information processing system according to a second embodiment of the present invention. In the first embodiment, whether or not the URL list 501 is updated was determined in the printing solution system, which is an example of the information processing system. And in the case where the number of acquisitions in which the URL list that has not been updated has been acquired exceeds the upper limit, it is determined that the state of the server is abnormal. In the present embodiment, an acquisition interval of the URL list is adjusted. If the acquisition interval is fixed, for example, when performing processing that requires time or the like, the HTTP request is transmitted more than necessary to the storage server, and thereby the communication cost increases. However, if the acquisition interval is set long, the notification to the upper layer application is delayed, and finally the response to the end user is delayed. Accordingly, in the present embodiment, the acquisition interval is approximately set in accordance with the updated content of the URL list.

Figure 11:
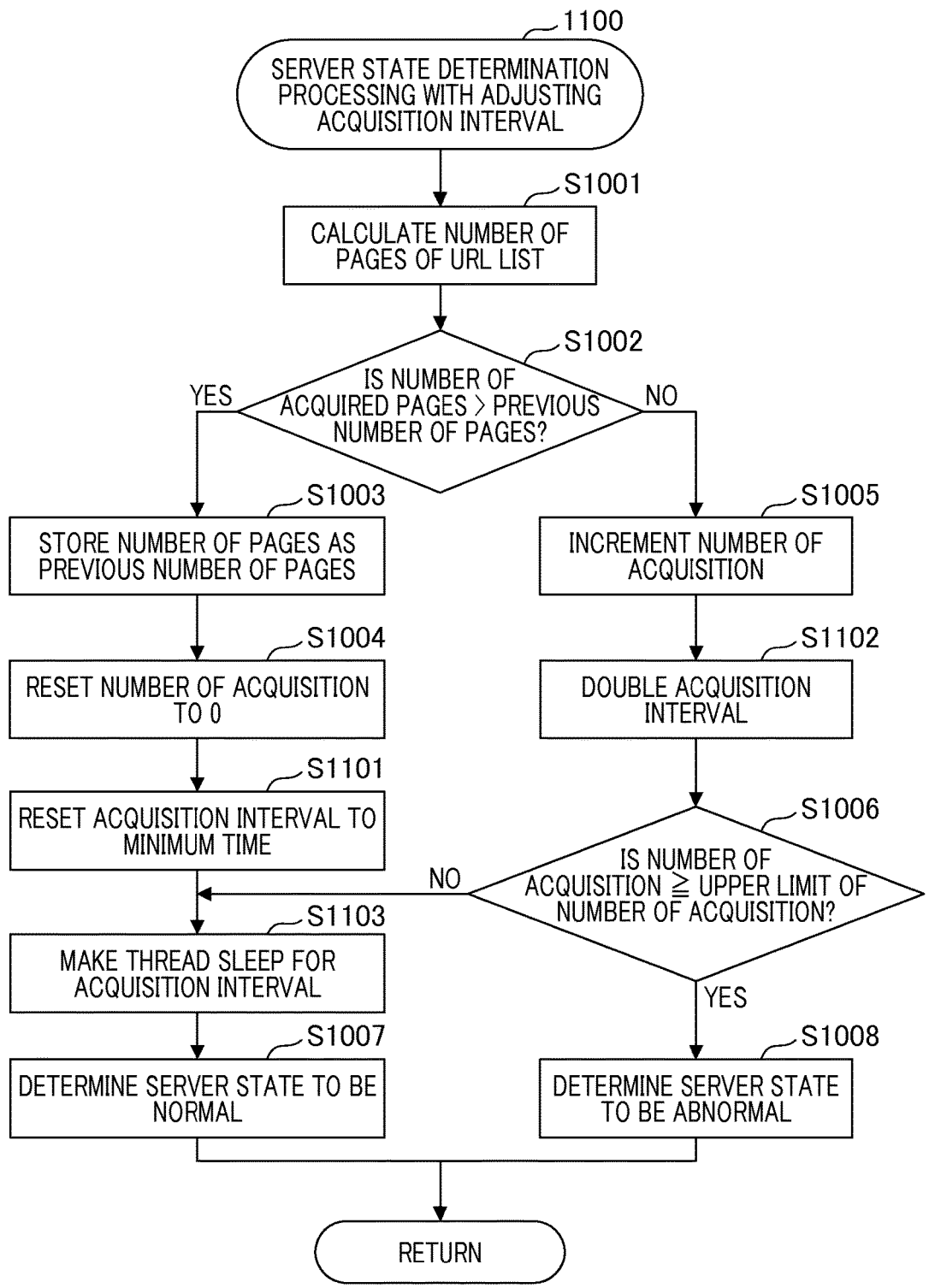
FIG. 11 is a flowchart illustrating server state determination processing.

FIG. 11 is a flowchart illustrating a server state determination according to the present embodiment. Note that the same reference sign is used for the same processing in the server state determination processing according to the first embodiment shown in FIG. 10 and the explanation thereof will be omitted.

Server state determination processing 1100 is performed by the document conversion processing unit 302. Firstly, in step S905 of the URL acquisition processing shown in FIG. 9, the document conversion processing unit 302 proceeds to step S1100 of the server state determination processing. In step S1002, the document conversion processing unit 302 compares whether the number of pages already acquired of the URL list 501 is larger than the number of pages previously acquired. In other words, whether or not the URL list 501 is updated is determined, and if it is determined that the URL list 501 is updated, the processing proceeds to step S1003. In step S1101, the document conversion processing unit 302 resets the acquisition interval to a minimum time. Then, in step S1103, the document conversion processing unit 302 makes the current thread sleep for the set acquisition interval. In the present embodiment, processing is simply stopped, and as long as the request is not transmitted to the storage server, other processing may be performed. In contrast, in step S1002, if the document conversion processing unit 302 determined that the URL list 501 has not been updated, the processing proceeds to step S1005.

In step S1102, the document conversion processing unit 302 sets the acquisition interval of the URL list to double that of the current (when last queried). In the present embodiment, due to prolonging the acquisition interval, it is set to be doubled, but it is not limited thereto. For example, a different way of extending may be adopted in accordance with the state of the server or the network. Subsequently, in step S1006, the document conversion processing unit 302 compares whether or not the number of acquisitions exceeds the upper limit of the number of the acquisitions. If the number of acquisitions has not exceeded the upper limit, the processing proceeds to step S1103, and in step S1102, the document conversion processing unit 302 makes the current thread sleep for the acquisition interval which is doubled in step S1102. In contrast, if the number of acquisition of the URL list has exceeded the upper limit in step S1006, the processing proceeds to step S1008, and the document conversion processing unit 302 determines that the server state is abnormal. In this way, by adjusting the acquisition interval of the URL list, for example, the erroneous detection, in which the conversion processing requiring long time for the large pages of a document of the conversion server 101 is determined to be an abnormal state, can suppress the acquisition of the converted document. Also, even if the acquisition interval is set long, due to the processing in step S1006, in the abnormal state, the server is determined to be in an abnormal state without making the thread sleep, and thereby the user can be notified about the abnormality more quickly.

Figure 12:
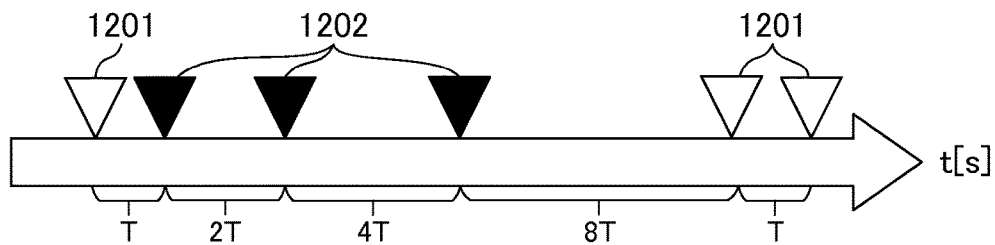
FIG. 12 is a diagram illustrating an example of an acquisition timing of the URL list.

FIG. 12 is a diagram illustrating an example of the acquisition timing when the acquisition interval of the URL list is adjusted.

In FIG. 12, reference signs 1201 and 1202 indicate the timing at which the client computer 106 acquires the URL list. In other words, the timing is after the client computer 106 has confirmed the update of the URL list 501 in step S1002 of the server state determination processing and performed processing to transmit the acquisition request to the storage server 102. The reference sign 1201 indicates the case that the URL list 501 has been updated, and the reference sign 1202 indicates the case that the URL list 501 has not been updated. FIG. 12 indicates that the URL list 501 acquired the first time has been updated, but the URL list 501 acquired 2 to 4 times has not been updated. As shown in FIG. 12, at 2 to 4 times, each of the acquisition intervals from after the acquisition request of the URL list is performed, until the next time the acquisition request is performed, the acquisition interval is doubled and extended (by the processing of step S1102). Furthermore, since the URL list 501 acquired at the 5th time has been updated, the acquisition interval when the client computer 106 acquires the URL list at the 6th time has been returned to a normal interval (by the processing of step S1101).

As described above, according to the present embodiment, an effect that is similar to that of the first embodiment is provided. Furthermore, according to the present embodiment, if the URL list has been updated, the acquisition of the URL list is performed in a short interval. In contrast, if the URL list has not been updated, it is estimated that the processing of the conversion server has taking time, and the interval to acquire the URL list will be extended. As a result, if the conversion server is performing a processing that requires time, the number of acquisitions of the URL list is reduced and the communication cost and the load of the storage server can be suppressed. Also, if it is inferred that the processing is proceeding smoothly, the notification to the upper layer application can be done quickly.

Third Embodiment

Next, a description will be given of an information processing apparatus according to a third embodiment of the present invention. In the first embodiment, whether or not the URL list has been updated was determined in the printing solution that is an example of the information processing system. And in the case where the number of acquisitions in which the URL list that has not been updated has been acquired exceeds the upper limit, it is determined that the state of the server is abnormal. In the present embodiment, in addition whether or not the URL list has been updated, the conversion server periodically performs a communication operation and by acquiring a timestamp indicating the timing thereof, the state of the conversion server is determined. By confirming the timestamp, the state of the server can be confirmed more clearly.

Hereinafter, a description will be given of specific processing of the present embodiment.

Firstly, a file for the timestamp is created in the storage server 102 in advance. The conversion server 101 is made to periodically perform processing of writing the timestamp to the storage server even if the document conversion has not finished. More specifically, in step S402 of the sequence diagram shown in FIG. 4, the document conversion processing unit 302 provides notification about the completion of uploading the conversion source document. Based on this notification, the conversion server 101 starts the conversion. Then, until the result is stored in the storage server 102 in step S405 and step S406, the document conversion processing unit 302 periodically stores a file, of which current date and time is recorded as a timestamp for confirming the operation of the server, to the storage server 102. Note that the conversion server 101 notifies the client computer 106 about the URL of a storage destination for the timestamp (the file that the current date and time is recorded) in step S400 or step S402.

Figure 13:
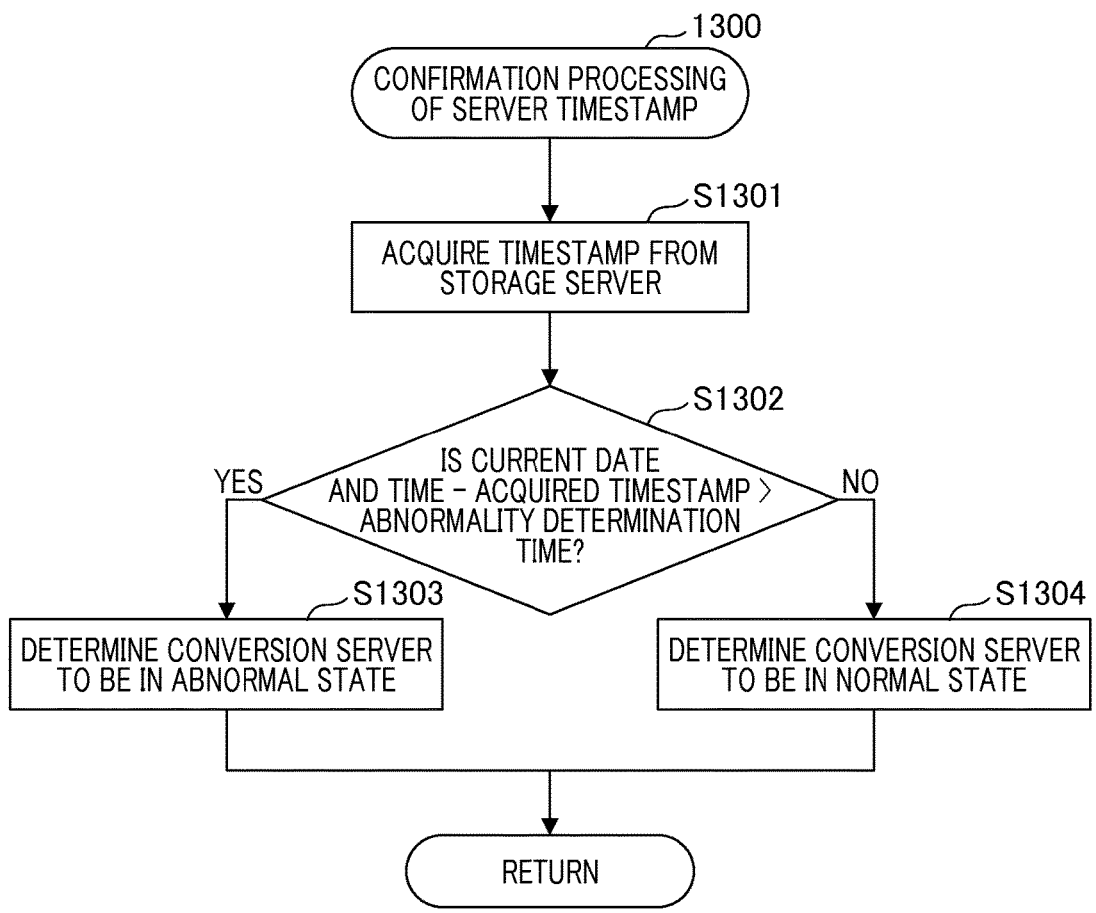
FIG. 13 is a flowchart illustrating confirmation processing of a server timestamp.

FIG. 13 is a flowchart illustrating a confirmation processing of a server timestamp for performing confirmation of the aforementioned timestamp.

The confirmation processing of a server timestamp 1300 may be performed during the URL list acquisition processing 900 or may be periodically performed asynchronously.

Firstly, in step S1301, the document conversion processing unit 302 acquires the timestamp for confirming the operation of conversion server 101 from the storage server 102. Next, in step S1302, the document conversion processing unit 302 calculates an elapsed time from the acquired timestamp that was recorded based on the current date and time. If the elapsed time has exceeded an abnormality determination time, the processing proceeds to step S1303, and the conversion server 101 determines that the server state is in abnormal state. If the elapsed time is below the abnormality determination time, the processing proceeds to step S1304 and the conversion server 101 determines that the server state is in normal state. Here, in the server state determination processing 1000, even if the number of acquisitions of the URL list exceeds the predetermined threshold, if it can be determined that the server is operating normally based on the timestamp, the server is determined to be normally operating. Accordingly, if processing that requires time is performed in the conversion server, the erroneous determination that the conversion server is in an abnormal state even if it is normally performing processing can be more suppressed. Also, in a case where the number of acquisitions of the URL list does not exceed the predetermined threshold in the server state determination processing 1000, if it can be determined that the server is not operating normally based on the timestamp, it may be determined that the server is not operating normally. Accordingly, the user may be notified about the abnormality more quickly.

As described above, in the present embodiment, an effect is provided that is similar to that of the first embodiment. Furthermore, according to the present embodiment, due to the confirmation of the timestamp periodically stored by the conversion server, whether or not the conversion server 101 is normally operating can be determined more accurately.

Note that if the function of the present embodiment can be realized, the present invention can be applied to a single apparatus or a system consisting a plurality of apparatuses. If the function of the present embodiment can be realized, the present invention can be applied to a system in which the connection is performed through a network such as LAN, WAN, WWAN, internet, or the like and the processing is performed. Furthermore, the present invention may be applied to an apparatus consisting of one apparatus including a case that it is configured by a virtual OS or the like. Moreover, the present invention may be applied to a system configured by cloud computing in which an information processing apparatus is through the internet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-244099, filed Dec. 2, 2014, which is hereby incorporated by reference wherein in its entirety.

What is claimed is:

1. An information processing apparatus comprising:
a memory for storing a computer program; and
a processor for executing the computer program to perform:
acquiring a list of pages created by a first server;
determining, based on a presently acquired list of created pages and a previously acquired list of created pages, whether a number of the created pages in the presently acquired list is larger than a number of the created pages in the previously acquired list;
incrementing a number of acquisitions of the list if it is determined that the number of the created pages in the presently acquired list is not larger than the number of the created pages in the previously acquired list;
resetting the number of acquisitions if it is determined that the number of the created pages in the presently acquired list is larger than the number of the created pages in the previously acquired list; and
notifying an error if the incremented number of acquisitions exceeds a predetermined number of times.

2. The information processing apparatus according to claim 1, wherein the number of acquisitions is reset to 0 if it is determined that the number of the created pages in the presently acquired list is larger than the number of the created pages in the previously acquired list.

3. The information processing apparatus according to claim 1, wherein the processor further executes the computer program to perform setting an acquisition interval for acquiring the list that is longer than a present acquisition interval if it is determined that the number of the created pages in the presently acquired list is not larger than the number of the created pages in the previously acquired list.

4. The information processing apparatus according to claim 1, wherein the processor further executes the computer program to perform acquiring a time stamp written by the first server, and
wherein an error is notified if an interval between the time stamp and a current time has exceeded a predetermined time.

5. The information processing apparatus according to claim 4, wherein, even if the incremented number of acquisitions has exceeded the predetermined number of times, if the interval between the time stamp and the current time has not exceeded the predetermined time, the error is not notified.

6. The information processing apparatus according to claim 1, wherein the list is acquired from a storage server in which the pages created by the first server are stored.

7. The information processing apparatus according to claim 1, wherein the first server creates the pages by converting converts a data format of pages included in a document that is received from the information processing apparatus.

8. A control method for an information processing apparatus, the method comprising:
  acquiring a list of pages created by a first server;
  determining, based on a presently acquired list of created pages and a previously acquired list of created pages, whether a number of the created pages in the presently acquired list is larger than a number of the created pages in the previously acquired list;
  incrementing a number of acquisitions of the list if it is determined that the number of the created pages in the presently acquired list is not larger than the number of the created pages in the previously acquired list;
  resetting the number of acquisitions if it is determined that the number of the created pages in the presently acquired list is larger than the number of the created pages in the previously acquired list; and
  notifying an error if the incremented number of acquisitions exceeds a predetermined number of times.

9. The controlling method according to claim 8, wherein the incremented number of acquisitions is reset to 0 if it is determined that the number of the created pages in the presently acquired list is larger than the number of the created pages in the previously acquired list.

10. The controlling method according to claim 8, wherein an acquisition interval for next acquiring the list is set longer than a present acquisition interval if it is determined that the number of the created pages in the presently acquired list is not larger than the number of the created pages in the previously acquired list.

11. The controlling method according to claim 8, further comprising:
  acquiring a time stamp written by the first server,
  wherein an error is notified if an interval between the time stamp and a current time has exceeded a predetermined time.

12. The controlling method according to claim 11, wherein, in the notifying, even if the incremented number of acquisitions has exceeded the predetermined number of times, if the interval between the time stamp and the current time has not exceeded the predetermined time, the error is not notified.

13. A non-transitory storage medium on which is stored a computer program for making a computer execute:
  acquiring a list of pages created by a first server;
  determining, based on a presently acquired list of created pages and a previously acquired list of created pages, whether a number of the created pages in the presently acquired list is larger than a number of the created pages in the previously acquired list;
  incrementing a number of acquisitions of the list if it is determined that the number of the created pages in the presently acquired list is not larger than the number of the created pages in the previously acquired list;
  resetting the number of acquisitions if it is determined that the number of the created pages in the presently acquired list is larger than the number of the created pages in the previously acquired list; and
  notifying an error if the incremented number of acquisitions of the list exceeds a predetermined number of times.

* * * * *